Aug. 23, 1932.  H. KETEL  1,872,750
SAFETY HITCH
Filed May 5, 1930   2 Sheets-Sheet 1
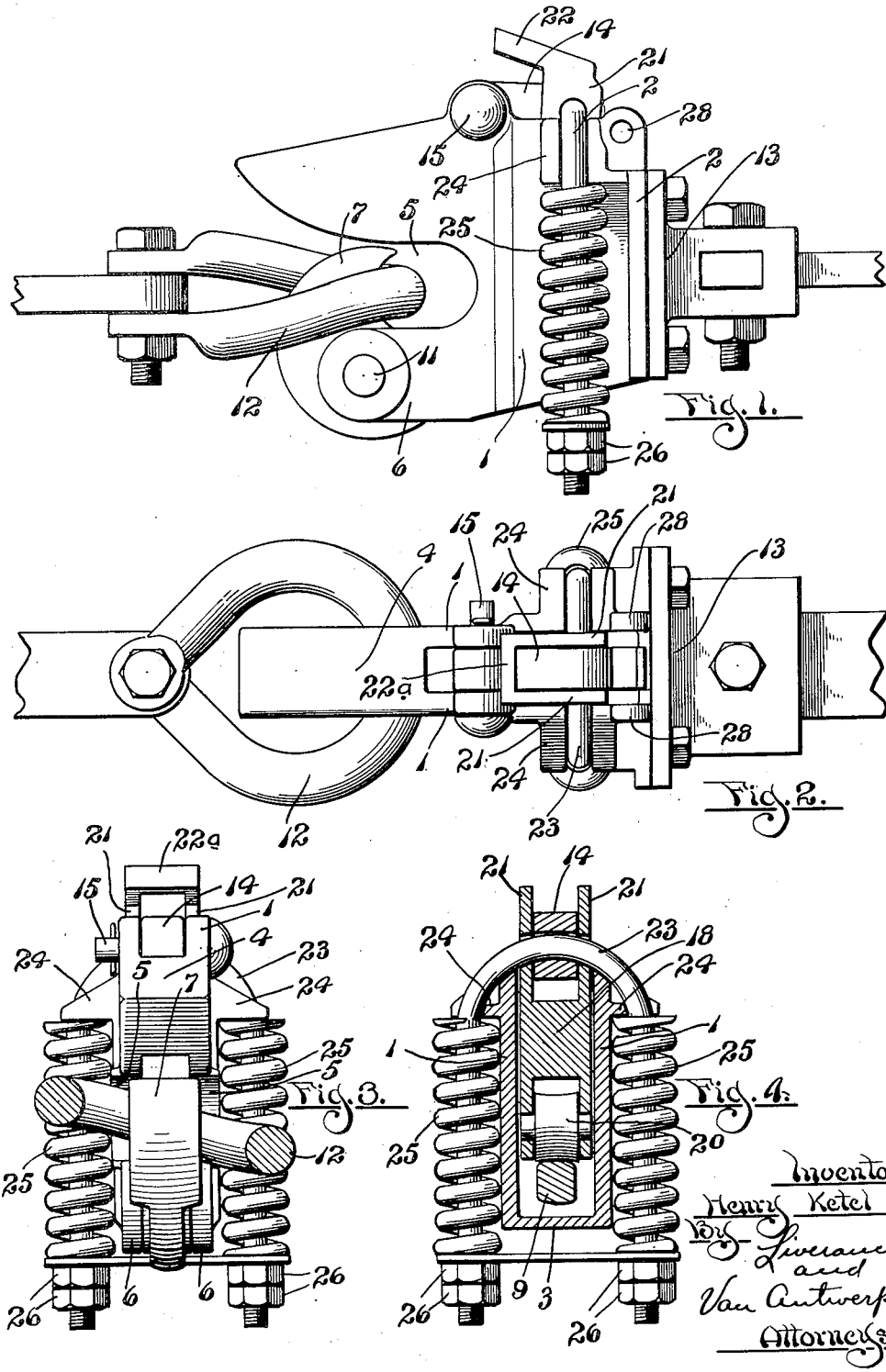

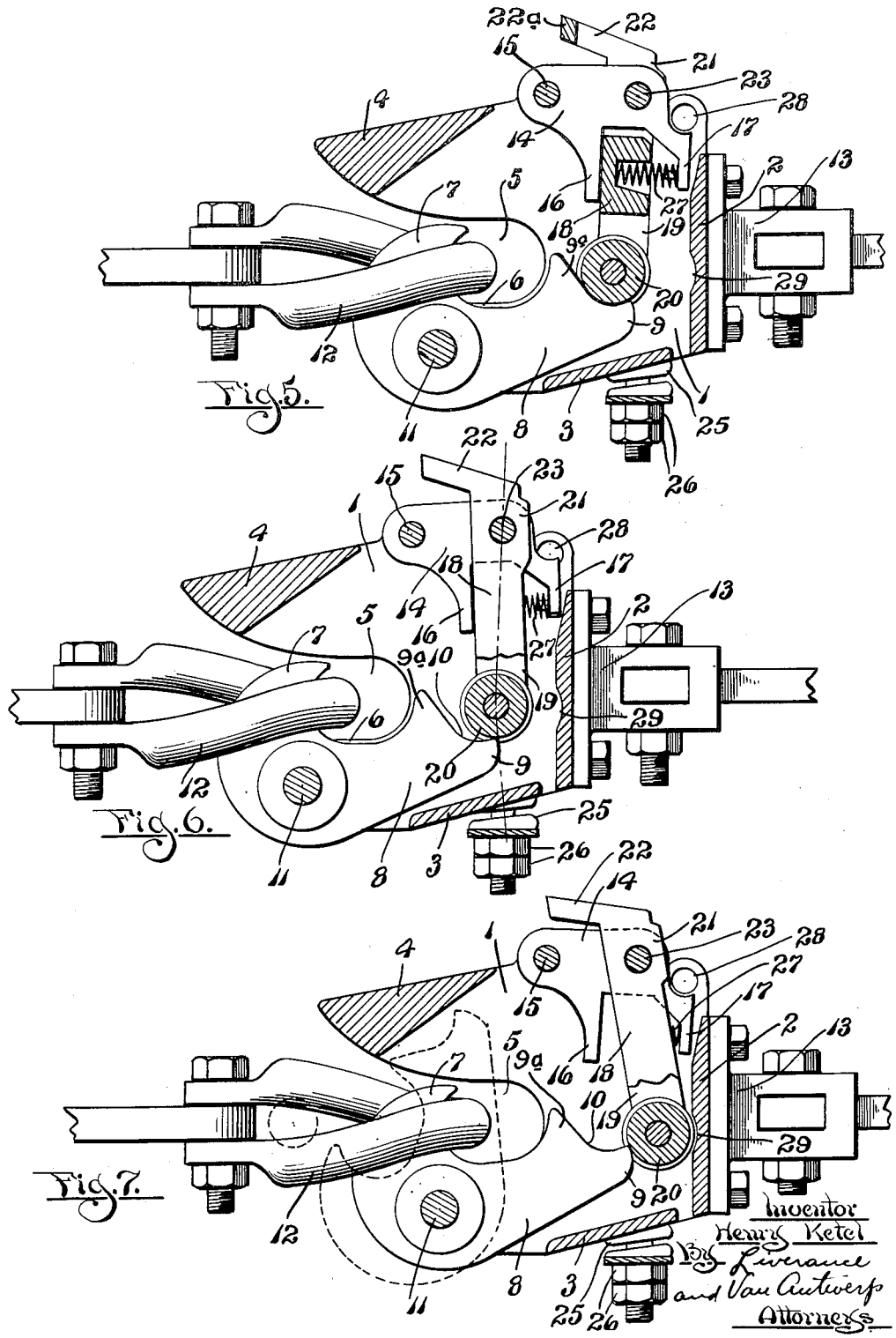

Patented Aug. 23, 1932

1,872,750

UNITED STATES PATENT OFFICE

HENRY KETEL, OF HOLLAND, MICHIGAN, ASSIGNOR TO HOLLAND HITCH COMPANY, OF HOLLAND, MICHIGAN, A CORPORATION OF MICHIGAN

SAFETY HITCH

Application filed May 5, 1930. Serial No. 449,880.

This invention relates to a safety hitch designed to be used between a truck or tractor or other means for drawing implements and the implement or implements which are drawn, and the hitch is provided with means whereby when the pulling force reaches a predetermined amount the safety hitch operates to automatically disconnect the truck, tractor or other pulling device from the implements which are being drawn or pulled.

It is particularly desirable when a tractor is drawing farm implements, such as plows, and the same strike some obstruction in the ground, that such immediate automatic disconnection take place in order to obviate breaking of parts of either the tractor or plows and to keep the tractor from rearing backward which may occur with some makes thereof.

The present invention is concerned with a very simple and economically constructed hitch of the character outlined and in which the invention consists in many novel constructions and arrangements and combinations of parts for effectively attaining the ends stated, all of which will appear from the following description taken in connection with the accompanying drawings, in which, Fig. 1 is a side elevation of the safety hitch of my invention.

Fig. 2 is a plan view thereof.

Fig. 3 is a front elevation of the hitch.

Fig. 4 is a vertical transverse section through the hitch.

Fig. 5 is a vertical longitudinal section through the hitch showing the parts in their operative relation when a tractor or truck and a drawn implement are connected together.

Fig. 6 is a view similar to Fig. 5 showing the position of the parts immediately before an automatic release takes place, and Fig. 7 is a like view showing the position of the parts after the release has taken place.

Like reference characters refer to like parts in the different figures of the drawings.

In the construction of the hitch a body in the form of an integral casting is made, having spaced apart parallel sides 1 integrally connected at one end by a vertical member 2 and at their lower sides by a cross member 3 while at the opposite end of the hitch body and at the upper side the sides 1 are integrally connected by a cross block 4 as shown. The sides are formed with inwardly extending slots 5 immediately below the part 4 described and above spaced apart arms 6 extending from the sides 1 of the body in parallel relation to each other.

Between the arms 6 an engaging hook member is pivotally mounted. This hook member comprises the hook proper 7 curved from the body 8 of the member, the hook being at one end while at the opposite end a short arm 9 extends from the body above which it is formed with a shallow concaved recess 10 back of an upward projection 9a integral with the body 8. The hook member is pivotally mounted on a pivot 11 which passes through the same between the hook 7 and the inwardly extending body part 8, said pin passing through and having a mounting near the outer ends of the arms 6 as best shown in Fig. 1.

The hook member, when in its operative position, is designed to have a clevis 12 engaging back of the hook 7 which clevis may be partly received in the slots 5 and which cannot disengage from the hook member so long as it is held in its operative position shown in Figs. 1 and 5. The clevis is designed to make a connection between the hitch and the plows or other implements which may be drawn. At the other end of the hitch a connecting member 13 of any desired design and construction is bolted or otherwise permanently secured to the part 2 adapted to receive the draw bar of the tractor.

Between the sides 1 of the body described and at the upper portion thereof an irregularly shaped lever member 14 is pivotally mounted at one end at 15 and is formed with two spaced apart downwardly extending arms 16 and 17 as shown. A substantially vertical bar 18 is divided at its lower end to provide spaced apart sides 19 between the lower end portions of which a roller 20 is rotatably mounted. The bar is also divided at its upper end making spaced apart sides 21 which extend upwardly one at each side of the lever member 14 and are then extended at an angle making a U-shaped handle having sides 22 connected by a cross member 22a. An inverted U-shaped rod 23 passes freely through the lever member 14 and the upwardly extending sides 21 of the bar 18 (see Fig. 4), the legs of the U extending downwardly one along each side 1 of the body of the hitch as shown in Figs. 3 and 4. Said sides of the body near their upper edges are formed with outwardly extending shoulders 24 grooved to permit the passage of the legs of the member 23. Heavy coiled compression springs 25 are used, one around each of the legs of the U-shaped member 23, the upper ends of the springs bearing against the undersides of the shoulders 24. A plate or flat bar lies between the lower end portions of the legs of the member 23 against which the lower ends of the springs 25 bear, and securing and locking nuts 26 are threaded onto the lower end of said legs against said plate. It is evident that the springs may be more or less compressed by adjusting the nuts 26 to different positions and in this manner the compressive force of the springs regulated.

The intermediate portion of the bar 18 is located between the downwardly extending arms 16 and 17 of the member 14 and at one side is provided with a recess for the reception of one end portion of a relatively light coiled spring 27, the opposite end bearing against the arm 17. The sides 1 of the body above and at the free end portion of the lever member 14 are formed with ears through which aligned openings 28 are made so that a bolt may be inserted therethrough to lock the lever 14 against upward movement should such be desired at any time. The inner side of the part 2 is provided with a concaved recess 29 to permit the necessary movement of the bar 18, the recess receiving the adjacent part of the roller 20 as shown in Fig. 7.

When the hitch is in operative position the parts are as shown in Fig. 5, that is, the roller 20 is seated in the concaved recessed portion 10 above the arm 9 on the body of the hook member. This maintains the hook member in substantially horizontal position so that with the clevis 12 engaged with the hook 7 thereof there can be no disconnection of the clevis from said hook member. With the increase in pull upon the clevis there is a tendency to turn the hook member about the pivot 11 in a counterclockwise direction which is normally stopped by the roller 20 seating against the arm 9, but as the springs 25 may be compressed upon application of sufficient force, when the force has become sufficient to compress the springs 25, there is an elevation or lifting of the U-shaped member 23 with a simultaneous turning of the lever member 14 which causes a lifting of the bar 18 and also a turning of the lower end portion thereof in a counterclockwise direction; and if such pulling force exceeds a predetermined amount the roller 20 is lifted and turned so that it will disengage from the recess 10 above the arm 9.

In Fig. 6 the parts are illustrated at substantially the critical position such that any further compression of the springs 25 will cause a disconnection of the roller from the arm 9 of the hook member; and in this position, as indicated in dotted and dash lines in Fig. 6, the toggle between the center of the rod 23 and the axis of the roller 20 and between said axis and the point of the arm 9 is very nearly on dead center so that a little further movement of the bar 18 will cause the axis of the roller 20 to pass by the dead center and then turn immediately from the position shown in Fig. 6 to that shown in Fig. 7, whereupon the hook member is released to turn to the dotted line position shown in Fig. 7 thereby releasing the clevis 12 from the hook.

The spring at 27 is of sufficient force that when the hook member has turned to the dotted line position shown in Fig. 7 it will turn the bar 18 back so that it engages against the inner side of the arm 16. The handle 22 may be operated to turn bar 18 for release of the hook member when the parts are not under pulling strain, or for reconnecting the clevis 12 to the hook member and turning said hook member back to its normal position; or after the clevis has been placed in proper position with respect to the hook 7 the hook member may be turned back whereupon the outer curved edge of the arm 9 will ride against the roller 20 until it passes underneath whereupon the spring 27 will move the roller 20 to seat in the recess 10.

The projection 9a adjacent the roller 20 is of considerable value in the construction as any wear which takes place between the roller and its seat 10 which joins with the adjacent edge of the projection 9a is minimized as to any detrimental consequences thereof by reason of the protection that the projection 9a affords. A large body of metal must be substantially worn away before the device becomes useless; and any hitch which lasts long enough that the projection 9a is even appreciably worn will have served its purposes. There is no delicacy of adjustment such that wear is detrimental and in the present construction the projection 9a maintains the device in proper order even though considerable wear should take place.

This construction of a hitch is one of simple and economical form and is very readily produced with a minimum of machine work in connection therewith. Placing a bolt through the openings 28 has the effect of changing the automatically detachable hitch to one which will not detach or disconnect under pulling strains. It is apparent, however, that with the bolt through the openings 28 no interference is made with the manual operation of the handle, at 22, of the bar 18 so that a manual disconnection of the clevis 12 from the hook 7 may be accomplished very readily, and also that a repositioning of the clevis in the hook member and turning the hook member to the operative position shown in Fig. 5 is readily accomplished even though the bolt through the openings 28 is in place. This quick change from the automatically detachable hitch to what is known as the commercial hitch is one of value and may be used in many instances as where there is little or no danger of heavy pulling strains being encountered. The invention is defined in the appended claims and is to be considered comprehensive of all forms of structure coming within their scope.

I claim:

1. A hitch comprising, a body having vertical spaced apart connected sides, said sides being slotted inwardly at one side edge thereof, a hook member pivotally mounted between said sides of the body below the slots therein and extending at its outer end into the horizontal plane of said slots, a lever member pivotally mounted at one end between and adjacent the upper edges of the sides of said body and having a downwardly extending arm, a bar divided at its upper end to pass by at either side of the hook member and adapted to bear against one side of said arm, a roller carried at the lower end of the bar engaging with and above the inner end of said hook member, an inverted U-shaped rod passing through said lever member and bar thereby connecting the same together and having legs extending downwardly one along each side of the body, a coiled spring around each leg of said U-shaped member bearing at its upper end against the body, and nuts threaded onto the lower ends of said legs against the lower ends of said springs.

2. A hitch comprising, a body member having spaced apart connected vertical sides, said sides having slots cut inwardly therein from one side edge thereof, a hook member pivotally mounted between the sides of said body below said slots and at its outer end having an upwardly curved hook extending into the horizontal plane of said slots and at its other end portion extending inwardly between the sides of the body and having an inwardly projecting arm at its inner extremity with a shallow concaved recess at the upper edge of said arm, a lever member pivotally mounted at one end between and near the upper edges of the sides of said body, said lever member having two spaced apart downwardly extending arms, a substantially vertical bar divided at its upper end to pass along each side of said lever member and lying between the downwardly extending arms thereof, spring means between the bar and one of said arms tending to move the bar against the other of said arms, a roller on the lower end of the bar adapted to seat in the recess above the arm on said hook member, means pivotally connecting said bar and lever member, and yieldable means of relatively heavy strength for resisting upward movement of said bar and the lever.

3. A hitch construction comprising, a body having spaced apart vertical connecting sides, said sides having slots therein extending inwardly from one edge thereof, a hook member pivotally mounted between the sides at a point below and near the outer ends of said slots, said hook member at its outer end having an upwardly curved hook and at its inner portion extending between said sides, a lever member pivotally mounted at one end between and adjacent the upper edges of said sides and having a downwardly extending arm, a substantially vertical bar located under said lever member and at the inner side of said arm thereon, means pivotally connecting the lever member and bar, a roller at the lower end of said bar adapted to seat against and above the inner end portion of said hook member, and relatively strong yielding means acting upon said bar and lever member to normally resist upward movement thereof.

4. A hitch comprising a body having vertically spaced apart connected sides, said sides being slotted inwardly horizontally at one edge thereof, a hook member pivotally mounted between said sides adjacent the slots and at its outer end having a curved hook extending part of the way across said slots, movable latch means slidably engaging the inner end portion of said hook member, spring means acting on said latch member to yieldably resist the movement thereof and means for automatically turning the latch member away from the inner end of the hook member to completely disengage the same therefrom on movement of said latch member beyond a predetermined position.

5. A hitch construction comprising, a body having vertical spaced connected sides, said sides being slotted substantially horizontally inward at one vertical edge thereof, and said sides of the body at the outer sides thereof having outwardly extending projections provided with shoulders at their undersides, a hook member pivotally mounted on and between the sides of said body below the slots therein and formed at its outer end with an upwardly curved hook and having an inwardly extending portion provided with a concaved recess near its inner end at its upper side, a lever member pivotally mounted at one end between and adjacent the upper edges of the sides of said body, two spaced apart arms extending downwardly from the lever member, a bar located under the lever member between said arms, relatively light spring means between the bar and one of said arms normally moving said bar to lie against the other of said arms, a roller at the lower end of said bar to engage in the recess at the inner end portion of said hook member, said bar at its upper end portion being divided so as to pass to each side of the lever member, an inverted U-shaped rod passing through the bar and said lever member and having downwardly extending legs, nuts threaded onto the lower ends of said legs and heavy coiled springs located one around each of said legs between the nuts thereon and said shoulders for the purposes described.

6. A construction containing the elements in combination defined in claim 5, said bar at the upper end portion thereof being provided with a laterally turned handle for manual operation thereof.

7. A construction containing the elements in combination defined in claim 5, said sides of the body above the free end portion of said lever member having aligned openings therethrough adapted for the insertion of a bolt through the openings to hold the lever against upward movement.

8. In a hitch, a supporting body, a hook member movably mounted thereon, latching means for holding the hook member in operative position, a pivotally mounted lever on which the latching means is pivotally mounted, spring means yieldingly holding the lever against movement whereby disconnection of the latching means from the hook member may automatically take place upon attainment of a predetermined pulling force on said hook member, and removable means carried by the body and located in the path of movement of said lever to stop the same from movement and prevent automatic release of said hook member, said latching means being manually operable to effect release of the hook member irrespective of whether or not said removable means is used.

In testimony whereof I affix my signature.

HENRY KETEL.